United States Patent
Rubin

(10) Patent No.: US 10,217,023 B1
(45) Date of Patent: Feb. 26, 2019

(54) IMAGE RECOGNITION SYSTEM USING A PROGRAMMABLE PHOTONIC NEURAL NETWORK

(71) Applicant: THE UNITED STATES OF AMERICA AS REPRESENTED BY THE SECRETARY OF THE NAVY, Washington, DC (US)

(72) Inventor: Stuart H. Rubin, San Diego, CA (US)

(73) Assignee: The United States of America as represented by Secretary of the Navy, Washington, DC (US)

( * ) Notice: Subject to any disclaimer, the term of this patent is extended or adjusted under 35 U.S.C. 154(b) by 119 days.

(21) Appl. No.: 15/622,463

(22) Filed: Jun. 14, 2017

(51) Int. Cl.
*G06K 9/62* (2006.01)
*G06N 3/067* (2006.01)
*G06N 3/04* (2006.01)

(52) U.S. Cl.
CPC ............. *G06K 9/6201* (2013.01); *G06N 3/04* (2013.01); *G06N 3/067* (2013.01)

(58) Field of Classification Search
USPC ....... 349/17, 114; 356/456; 359/10, 11, 107, 359/290, 559; 382/103, 156; 702/19; 706/15, 40
See application file for complete search history.

(56) References Cited

U.S. PATENT DOCUMENTS

| | | | | |
|---|---|---|---|---|
| 5,056,897 A | * | 10/1991 | Akiyama | G02F 1/1354 349/17 |
| 5,063,602 A | * | 11/1991 | Peppers | G06K 9/74 359/107 |
| 5,121,231 A | * | 6/1992 | Jenkins | G02B 5/32 359/10 |
| 5,285,308 A | * | 2/1994 | Jenkins | G02B 5/32 359/11 |
| 5,383,042 A | * | 1/1995 | Robinson | G06N 3/067 349/17 |
| 5,428,711 A | * | 6/1995 | Akiyama | G02F 1/1354 706/40 |

(Continued)

OTHER PUBLICATIONS

Rubin, Stuart H., "On Randomization and Discovery", Journal of Informational Sciences, vol. 177, issue 1, pp. 170-191, Jan. 2007.

(Continued)

*Primary Examiner* — Xuemei G Chen
(74) *Attorney, Agent, or Firm* — Spawar Systems Center Pacific; Kyle Eppele; Ryan J. Friedl

(57) ABSTRACT

A system uses arrays of spatial light modulators (SLMs) connected to a processor and an image capture device. An image is input into a first array of SLMs. The processor determines if the output of the first array matches an image stored within a database. If a match is found, the processor outputs a stored image to an image processing system. If a match is not found the processor directs the output from the first array into an input of an array of SLMs adjacent to the first array. The determination step is iteratively performed for the remaining arrays of SLMs until a match is found or no arrays remain. If no arrays remain, the processor selects a stored image from the database and obtains user feedback from a user input system. The feedback is then stored in the database and associated with the n−1 array of SLMs.

20 Claims, 5 Drawing Sheets

(56) References Cited

U.S. PATENT DOCUMENTS

| | | | | |
|---|---|---|---|---|
| 5,481,621 | A * | 1/1996 | Kuratomi | G06K 9/4628 |
| | | | | 382/156 |
| 5,486,442 | A * | 1/1996 | Takimoto | C08G 63/6886 |
| | | | | 349/114 |
| 5,699,449 | A * | 12/1997 | Javidi | G06K 9/00221 |
| | | | | 359/559 |
| 5,842,191 | A * | 11/1998 | Stearns | G06K 9/605 |
| | | | | 706/40 |
| 6,529,614 | B1 * | 3/2003 | Chao | G06K 9/3241 |
| | | | | 382/103 |
| 6,819,469 | B1 * | 11/2004 | Koba | G03F 7/70291 |
| | | | | 359/290 |
| 7,047,226 | B2 | 5/2006 | Rubin | |
| 7,082,369 | B1 * | 7/2006 | Rubin | G01N 15/1463 |
| | | | | 702/19 |
| 7,512,573 | B2 * | 3/2009 | Martinez | G06N 3/067 |
| | | | | 706/15 |
| 7,894,072 | B1 * | 2/2011 | Rubin | G01J 3/4535 |
| | | | | 356/456 |
| 8,073,804 | B1 | 12/2011 | Rubin | |
| 8,117,147 | B1 | 2/2012 | Rubin | |
| 8,250,022 | B1 | 8/2012 | Rubin | |
| 8,280,831 | B1 | 10/2012 | Rubin | |
| 8,285,728 | B1 | 10/2012 | Rubin | |
| 8,315,958 | B1 | 11/2012 | Rubin | |
| 8,447,720 | B1 | 5/2013 | Rubin | |
| 8,457,795 | B1 | 6/2013 | Rubin | |
| 8,489,648 | B1 | 7/2013 | Rubin | |
| 8,655,799 | B1 | 2/2014 | Rubin | |
| 8,768,869 | B1 | 7/2014 | Rubin | |
| 8,780,195 | B1 | 7/2014 | Rubin | |
| 8,862,621 | B1 | 10/2014 | Rubin | |
| 8,955,325 | B1 | 2/2015 | Rubin | |
| 9,299,025 | B1 | 3/2016 | Rubin | |
| 9,330,358 | B1 | 5/2016 | Rubin | |
| 9,396,441 | B1 | 7/2016 | Rubin | |
| 9,436,912 | B1 | 9/2016 | Rubin | |
| 9,449,280 | B2 | 9/2016 | Rubin | |
| 9,471,885 | B1 | 10/2016 | Rubin | |
| 2017/0351293 | A1 * | 12/2017 | Carolan | G02F 3/024 |

OTHER PUBLICATIONS

Rubin, Stuart H., "Computing With Words", IEEE Transactions on Systems, Man, and Cybernetics—Part B: Cybernetics, vol. 29, No. 4, pp. 518-524, Aug. 1999.

Rubin, S.H., Murthy, S.N.J., Smith, N.H., and Trajkovic, L., "KASER: Knowledge Amplification by Structured Expert Randomization," IEEE Transactions on Systems, Man, and Cybernetics—Part B: Cybernetics, vol. 34, No. 6, pp. 2317-2329, Dec. 2004.

Chaitin, G.J., "Randomness and Mathematical Proof," Sci. Amer., vol. 232, No. 5, pp. 47-52, 1975.

Rubin, Stuart H., Chen, S., and Shyu, M., "Field Effect Natural Language Semantic Mapping", IEEE International Conference on Systems, Man, and Cybernetics, vol. 3, pp. 2483-2487, Oct. 5-8, 2003.

Rubin, Stuart H., et al. "On the role of informed search in veristic computing", 2001 IEEE International Conference on Systems, Man, and Cybernetics, IEEE, Aug. 2002.

Rubin, Stuart H., et al., "Knowledge acquisition from corresponding domain knowledge transformations", IEEE International Conference on Information Reuse and Integration, IEEE, Aug. 2009.

Shen, Y., et al., "Deep Learning with Coherent Nanophotonic Circuits", Oct. 2016, available at https://arxiv.org/abs/1610.02365.

* cited by examiner

IMAGE RECOGNITION SYSTEM USING A PROGRAMMABLE PHOTONIC NEURAL NETWORK

FEDERALLY SPONSORED RESEARCH AND DEVELOPMENT

This invention is assigned to the United States Government and is available for licensing for commercial purposes. Licensing and technical inquiries may be directed to the Office of Research and Technical Applications, Space and Naval Warfare Systems Center, Pacific, Code 72120, San Diego, Calif., 92152; voice (619) 553-2778; email ssc_pac_T2@navy.mil. Reference Navy Case No. 104079.

BACKGROUND

Artificial neural networks (ANN) represent a family of statistical learning models, which derive from our biological neural networks. An ANN is represented by an interconnected group of nodes, which is similar in structure and function to the neurons in a brain. ANNs communicate among layers and attempt to minimize statistical error through training. The connections have numeric weights that can be adapted to minimize classification errors. ANNs are best suited to applications that are difficult, if not impossible, to realize using rule-based systems—including machine vision and automated speech understanding.

Much recent effort has focused on development of scalable intelligent systems that mimic the working of the human brain. Contemporary neural networks have been used for such intelligent systems, as provide one or more hidden layers for generalizing learning. However, this feature renders the learning algorithm intractable and thus not reusable. It follows that not only do these neural networks not function as does the brain, but they cannot even emulate brain function. There exists a need for improved intelligent systems and methods that can better emulate the functioning of the human brain, for applications such as image recognition.

DETAILED DESCRIPTION OF SOME EMBODIMENTS

Figure 1:
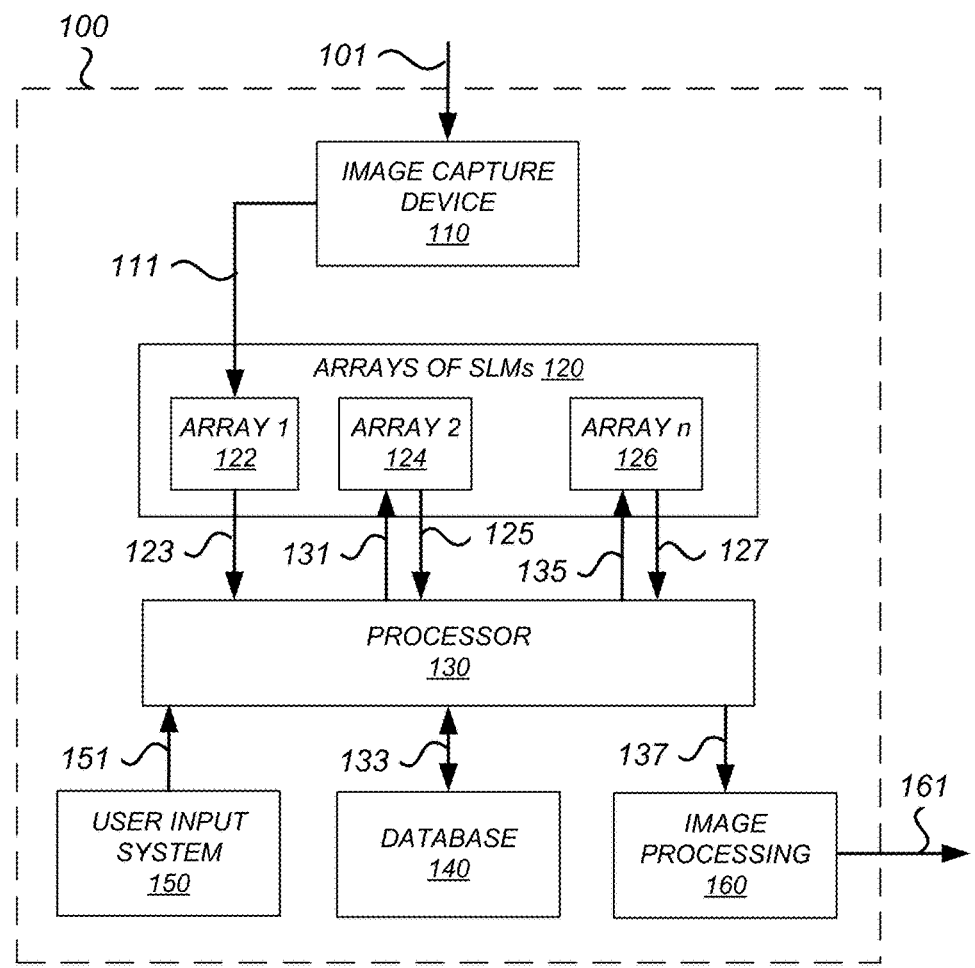
FIG. 1 shows a block diagram of an embodiment of a system in accordance with the disclosed subject matter.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities.

Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Further, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the disclosed embodiments include process steps and instructions described herein in the form of an algorithm. It should be noted that the process steps and instructions of the embodiments could be embodied in software, firmware or hardware, and when embodied in software, could be downloaded to reside on and be operated from different platforms used by a variety of operating systems. Different parts of the algorithm could be embodied in different elements of hardware or software, for example, as in a distributed system.

The subject matter discussed herein pertains to an image recognition system that uses a photonic neural network that speeds up the training and exercise of the neural network while improving its capability for the recognition of complex objects. Unlike the case for hidden-layer neural networks, such as back propagation, efficient recognition of complex objects is made possible through reuse. Problem decomposition is used to insure scalability, which remains a novel concept for neural network designs. Moreover, the tolerance for small errors allows photonic hardware to be applied for tractable realization. Such hardware will run thousands of times faster than its serial digital cousins, operate in more compact spaces, and without crosstalk and less power consumption—again supporting scalability.

Frequency modulated (FM) spatial light modulators (SLMs) may be used to provide ultimate scalability in terms of accuracy and power used. In lieu, relatively few parallel digital signal processor (DSP) chips can substitute in the final cascaded photonic "slices" for an immediately implementable design. Stereo and/or hyperspectral imagery can be realized through the use of concatenated vectors. Furthermore, these vectors can be symbolically processed at the backend, using an expert system, so as to further generalize their capabilities for recognition.

A case-based system, at the backend, enables the associative recall of complex objects from a partial (i.e., obscured) input pattern. A programmable decomposition substitutes for one or more (NP-hard) hidden layers, which are found in conventional neural networks. This results in an exponential speedup in learning in comparison with advanced conventional neural networks, using one or more hidden layers, because it supplies domain-specific knowledge. While such decompositions must be programmed, practice evidences that this is relatively easy to accomplish (even more so for symmetric systems).

The disclosed subject matter has additional pragmatic advantages too in that I/O constraint sets, used for training, as well as previously developed subsystems, can be stored and indexed in and retrieved from a library. This serves to make overall system development cost-effective as the result of an economy of scale. That is not the case for contemporary neural networks, since again their iterative training is inherently NP-hard. Finally, it is relatively easy to integrate scalable reusable functional programming with the approach—making for extensible intelligent systems.

The processes of speeding up the training and exercise of a neural network while improving its capability for the recognition of composed objects are amenable to photonic processing. Photovoltaic SLMs are practical using optical summation (i.e., amplitude modulation) or possibly electrically-mediated frequency summation (i.e., frequency modulation) using frequency-doubling lithium niobate crystals, or equivalent. The latter has the potential advantage of greater accuracy and scalability in summing cascaded amplitudes.

The weight training process, in a conventional hidden-layer neural network (e.g., back propagation), is NP-hard (i.e., intractable with scale). This is because the proper value(s) for each weight is a function of that for each other weight. However, the disclosed photonic approach to spatial and temporal summation is associated with logarithmic training and recognition time. Furthermore, the use of a programmable and reusable library of subsystems and constraint vectors for training makes for the easy design of neural systems too complex to design or train in any other way. Moreover, the capability for symbolic decomposition (e.g., of an image) implies that a case-based system and/or an associative symbolic memory can be implemented on the backend. Thus, partial images (or equivalent) can be auto-associated with known images (or equivalent) and corrected when feedback reveals an error. The human brain is known to operate in this manner.

The allowance for heuristic mapping (i.e., not all I/O pairs need be successfully mapped) allows complex solutions to be hill climbed. Thus, the disclosed methodology can qualitatively (i.e., more so for more complex recognition tasks) and quantitatively (i.e., in the number of equivalent fundamental memories) outperform back propagation. The disclosed embodiments pertain to a system that is exponentially faster in training and an order of magnitude faster in recognition than a system using back propagation. These can also execute in parallel in the number of block slices. The disclosed methodology utilizes novel generalized image slices for heuristic learning, realized via photonics, in lieu of one or more hidden layers. This greatly speeds up the training as well as the capabilities of the system for pattern recognition. In particular, unlike all but the k-means algorithm (which has no hidden layer and thus is not capable of distinguishing clockwise from counterclockwise spirals among other things), the disclosed algorithm is indefinitely scalable.

FIG. 1 shows a block diagram of an embodiment of an image recognition system 100 in accordance with the disclosed subject matter. An image 101 is captured by an image capture device 110, such as a camera. As an example, the input image 101 may be a still image, a series of images, or a video frame or frames. Image capture device 110 is connected to arrays of SLMs 120 such that image capture device 110 outputs the image 111 into an arrays of SLMs 120, namely first array 122. Arrays of SLMs 120 include first array 122, second array 124, through an $n^{th}$ array 126, where n is greater than two. The output 123, 125, and 127 of arrays 122, 124, and 126, respectively, is processed by processor 130.

Processor 130 provides input 131 and 135 to second array 124 through $n^{th}$ array 126, respectively. Processor 130 is connected to arrays of SLMs 120, a database 140, user input system 150, and image processing system 160. Processor 130 sends and receives information 133 to/from database 140, receives input 151 from user input system 150, and sends output 137 to image processing system 160. As an example, user input system 150 may be a desktop computer, laptop, mobile device, or other device as would be recognized by a person having ordinary skill in the art that allows input from a user to be communicated to a processor such as processor 130.

Database 140 has a plurality of stored images stored therein. In some embodiments, database 140 may be segmented by image vector length. The output 161 of image processing system 160 is a signal/information representing a processed image or a set of characteristics or parameters related to an image. As an example, image processing system 160 may be any type of system that processes an image using digital, analog, or optical processing techniques.

Figure 2:
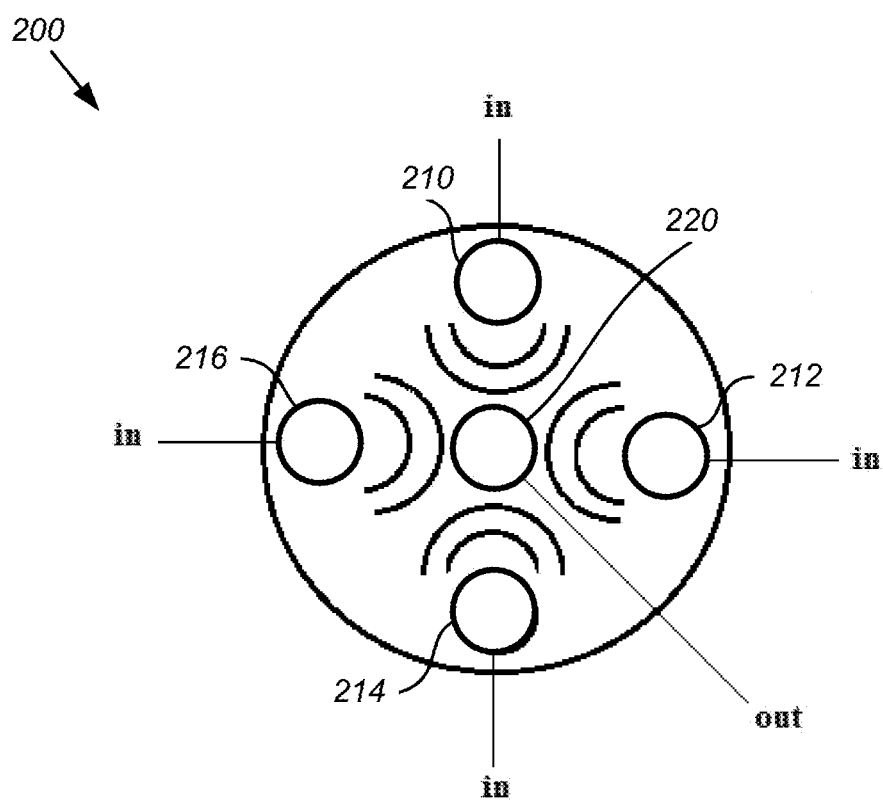
FIG. 2 shows a diagram of an embodiment of a 4:1 ratio spatial light modulator (SLM) that may be used in the system shown in FIG. 1.

FIG. 2 shows an example of an SLM 200 that may be used within system 100, particularly arrays of SLMs 120. SLM 200 has four inputs 210, 212, 214, and 216, with a single output 220. It should be recognized that other configurations of SLMs could be used within system 100 depending upon considerations including SLM size, cost, and available space. In some embodiments, the SLMs may utilize frequency modulation, while in other embodiments the SLMs may utilize amplitude modulation.

Regarding operation of system 100, let a requirements vector contain x mutually random I/O pairs, where it is required to maximize the attained number of such specified mappings. The less the symmetry among the I/O pairings, the fewer that are needed for the same coverage. The input comprises of a pattern vector (or matrix), which is mapped to a vector integer sequence. This vector, in turn, maps to an integer, which is associated with semantics. Training the net consists of associating the vector of least magnitude (i.e., most general) with the supplied input matrix. Incorrect maps require that a vector of slightly greater magnitude, where available, be created. Such a vector corresponds to more-specific learning, which preempts the error from recurring.

A practical problem is centering the image (i.e., assuming a visual sensory modality) on the input matrix. This may be accomplished using a second system, which is trained to center an arbitrary image on the input matrix using two degrees of freedom for motion. A third degree would be used to control the digital and/or mechanical zoom of the lens as well—for a most information-bearing image. Furthermore, this arrangement will mimic the saccadic-like movement of the eyes in viewing and recognizing areas of interest in a complex image.

Figure 3:
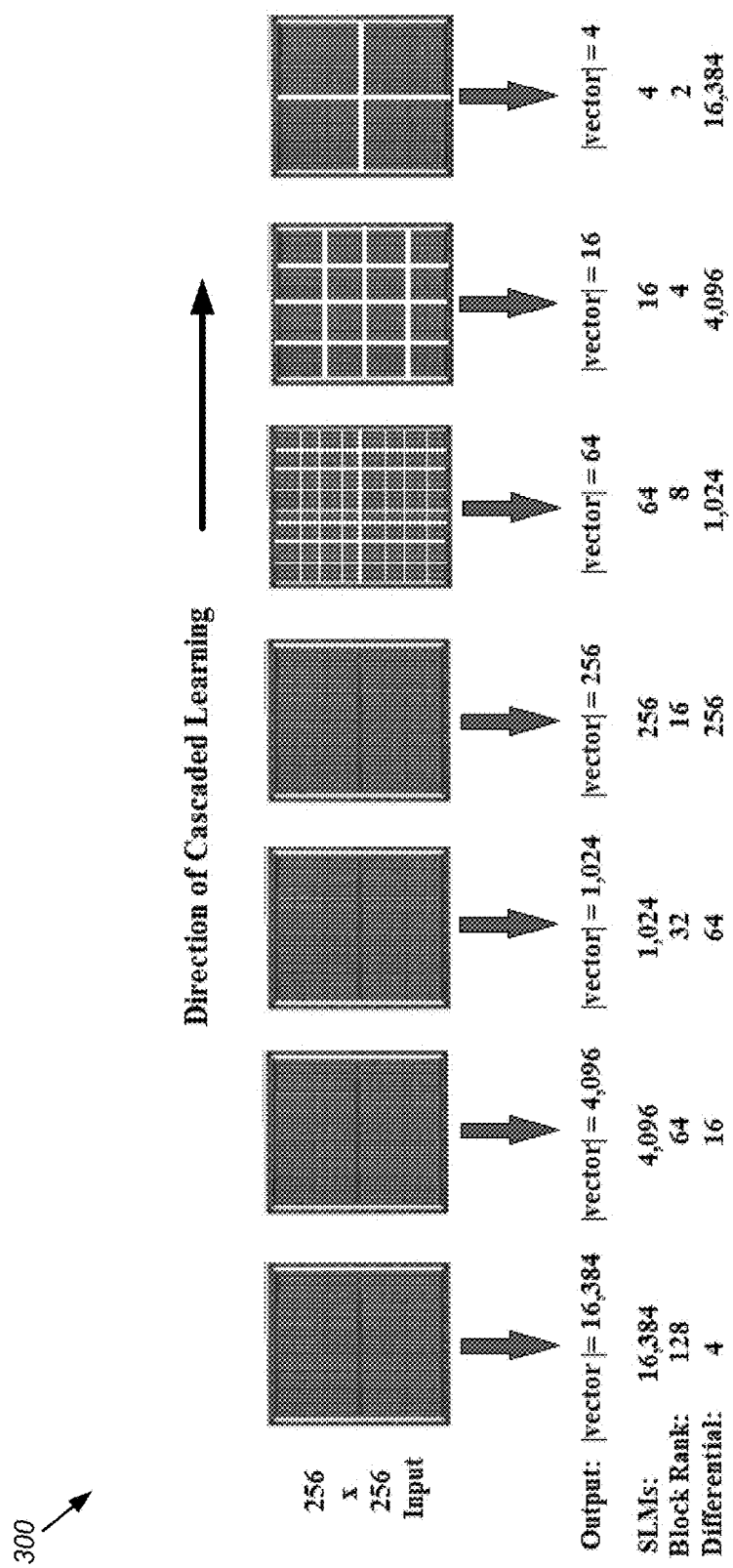
FIG. 3 shows a diagram illustrating the cascaded learning of the arrays of SLMs in accordance with the disclosed embodiments.

Block sizes for the SLMs vary from the finest, 1×1, to the coarsest, n×n. The coarsest block can only be used to determine if it is say light or dark in visual image processing and thus may be omitted. The block sizes are selected to allow a cascading of the SLMs, such as is shown in diagram 300 in FIG. 3). The set of block sizes, or slices, is a randomization. It thus saves somewhat on the required SLM real estate. For example, a 256×256 mesh, consisting of 65,536 black and white pixels, will have block sizes of rank 4, 16, 64, 256, 1,024, 4,096, and 16,384. Each block, at each rank, is sequentially processed by dedicated SLMs (see FIG. 3). The outputs of these photonic computations are ordered vectors of magnitude 16,384, 4,096, 1,024, 256, 64, 16, and 4, respectively. The range in intensity in each slices outputs is [0, 4], [0, 16], [0, 64], [0, 256], [0, 1,024], [0, 4,096], and [0, 16,384], respectively.

Each output vector is optically summed to yield the next input vector in sequence. While here this is only six times slower than a direct-memory access scheme, it minimizes the real estate needed for routing into the SLMs. Such routing traditionally comprises 90 percent of the chip's area. This provides a compensating speedup and minimizes the power requirements for the drivers, which increases super-linearly with the number of inputs to the AM SLM. Moreover, the cascading of slice outputs requires the summation of only four inputs per SLM. This minimizes the probability of error in numerical summation; albeit, not in intensity summation. Note that as the magnitude of the vectors is reduced, tiny parallel DSPs can be used to sum the final cascaded slices in lieu of FM SLMs without significant loss in speed. Such a hybrid approach serves to guarantee an immediately successful result.

As the number of inputs to be optically summed is cascaded, their intensities grow; and, as a result, the more difficult it will be for an A/D converter to convert the result to the proper integer within an acceptable potential for error. This limits the attainable number of cascaded slices of SLMs using amplitude modulation. Furthermore, unlike the wiring in a conventional hidden-layer neural network, the wiring of slices shown in FIG. 3 respects geometric locality. This means that an eye pixel is not fused with an ear pixel—allowing for true symbolic extraction, or problem decomposition (e.g., for the post-neural processing of extracted features).

Each block (i.e., other than a 1×1 block, where included) is summed using photonic processors. The parallel processing of optical summation makes the solution ideal for realization using photonic SLMs. The need for accuracy is not as critical here as in a digital computer—allowing for the optical quadratic speedup. For example, the 2×2 block, {1, 0, 0, 1}, yields a 2 for the block value. Each block occupies the same position in its representative vector. A parallel search, a bisection algorithm, or even sequential search is used to map the various sized blocks to their representative vectors. The vectors of greatest magnitude are most desired for recognition, while those of least magnitude are most desired for generalized storage. A new semantics is assigned to the block size of greatest rank (associated vector of least magnitude), whose output vector is unassociated, or nil.

Vectors are stored in a database, such as database 140, which in some embodiments is segmented by magnitude. Vectors in each segment can be found (or not) through the use of hashing. This is the fastest scheme. A slightly slower (logarithmic) scheme, using about half the memory, maintains each segment in lexicographic order and applies a bisection search to determine if a vector is known (or not) within a segment.

A problem with the hashing scheme is that it cannot be used to recognize near matches, which is required in practice. For example, a fly might land on a person causing a pixel to be off, but it should not preempt recognition of that person. This is only possible using fuzzy matching. Here, the matching algorithm incorporates an allowed numeric error, in each vector element, in the range [0, block ranks**2). For example, a 4×4 block (i.e., rank of 4) might allow an error of 2. Thus, if the true sum of its 16 pixels were 8 say, then sums in the range, [6, 10] would qualify as matching. The less the rank, the less the allowed error may be. Halving the block rank implies decreasing the capability of the SLM to differentiate intensities by a factor of four (and vice versa) for a constant numeric error. One may specify a single global error tolerance and have the allowed error per block rank automatically propagate. Blocks of least rank may thus allow zero error.

Object recognition involves computing all block slices (i.e., blocks of different ranks) and matching the vector produced by each against the appropriate database segment. The single global error tolerance is initialized to zero, then one, and thereafter doubled/halved for a bisection search (i.e., where the number of slices is generally ≥8). This search will converge on the minimal error tolerance for which a block of least rank (a vector of greatest magnitude) yields an associated output vector bearing a non-nil semantics.

Unknown or erroneous semantics result in the proper semantics being acquired for zero error tolerance. If the semantics are unknown, a block slice of greatest rank (a vector of least magnitude) is acquired. This represents a most-general representation. If the semantics are erroneous, the slice of next lesser rank (the vector of next greater magnitude) acquires the semantics. If there is no such slice (vector), the current semantics are updated. If there is no such error, the vector and its' semantics are acquired. The match minimizing the 2-norm (i.e., a measure of the squared differential) is always selected. Otherwise, if the semantics produced by a slice are non-deterministic, one is selected at random. A bisection search involving error tolerances includes a linear search between the found lower and upper bisection boundaries.

Colors can be captured by applying the primary filters, RGB, for a concatenated vector using three times the storage. Acoustic, radar, and other signatures are all processed similarly. Indeed, mutually random sensory modalities may be so fused for an extensible capability for stereo and/or hyperspectral imagery. The mapping is many vectors of varying magnitude to one semantic object. The use of an object-centering algorithm (vision) or equivalent (non-vision) will serve to reduce the number of redundant vectors mapping to the same object.

More than one object may be so recognized (e.g., in a single image). Thus, object recognition may be reused to define complex objects using a slide-box metaphor (e.g., the broken window is on the red house). Similarly, a picture of a person in a picture frame, for example, can inhibit the recognition of said person (e.g., for security camera use). Here, one object vector is trained to recognize the person and the other the containing frame. The fusion of the object feature vectors determines the object recognized and/or the course of action (COA). The combinatorics of such reuse allow for the build-up and recognition of far more complex objects than the number of fundamental memories or tractability will allow in hidden-layer neural networks. Again, this is only practical through the integration of conventional programmed computation with the previously defined photonic system of systems. Indeed, it is hypothesized that this randomization methodology underpins learning by post-tetanic potentiation in the human brain.

The use of photonic processing allows decision making to occur at roughly one billion times the speed of the human brain. Edge detection algorithms can be used to remove background clutter from features for improved performance. Moreover, all vectors can optionally be symbolically processed at the backend, using expert systems to further generalize their capabilities for recognition. Such algorithms can be integrated with the system disclosed herein and are software intensive. They stand to benefit from automatic programming.

There are n input lines defining the block of maximal rank, where the rank=$\sqrt{n}$ and n≥m. Assuming that the m I/O pairs are mutually random, there needs to be at least one distinct input line per I/O pair. This assemblage defines a system that takes n inputs and maps these inputs to (log 4 n)−1=(log n)/(log 4)−1 (by a change of base) vectors of reduced dimensionality. These vectors are further generalized by the allowance for a set error tolerance and its mapping, through a segmented database, to outputs having associated semantics. I/O training sets, as well as subsystems, are indexed in a library, retrieved, and reused. This process provides an economy of scale, which is another thing not available to hidden-layer neural networks. Their weight sets are too context-sensitive to allow for efficient reuse.

Figure 4:
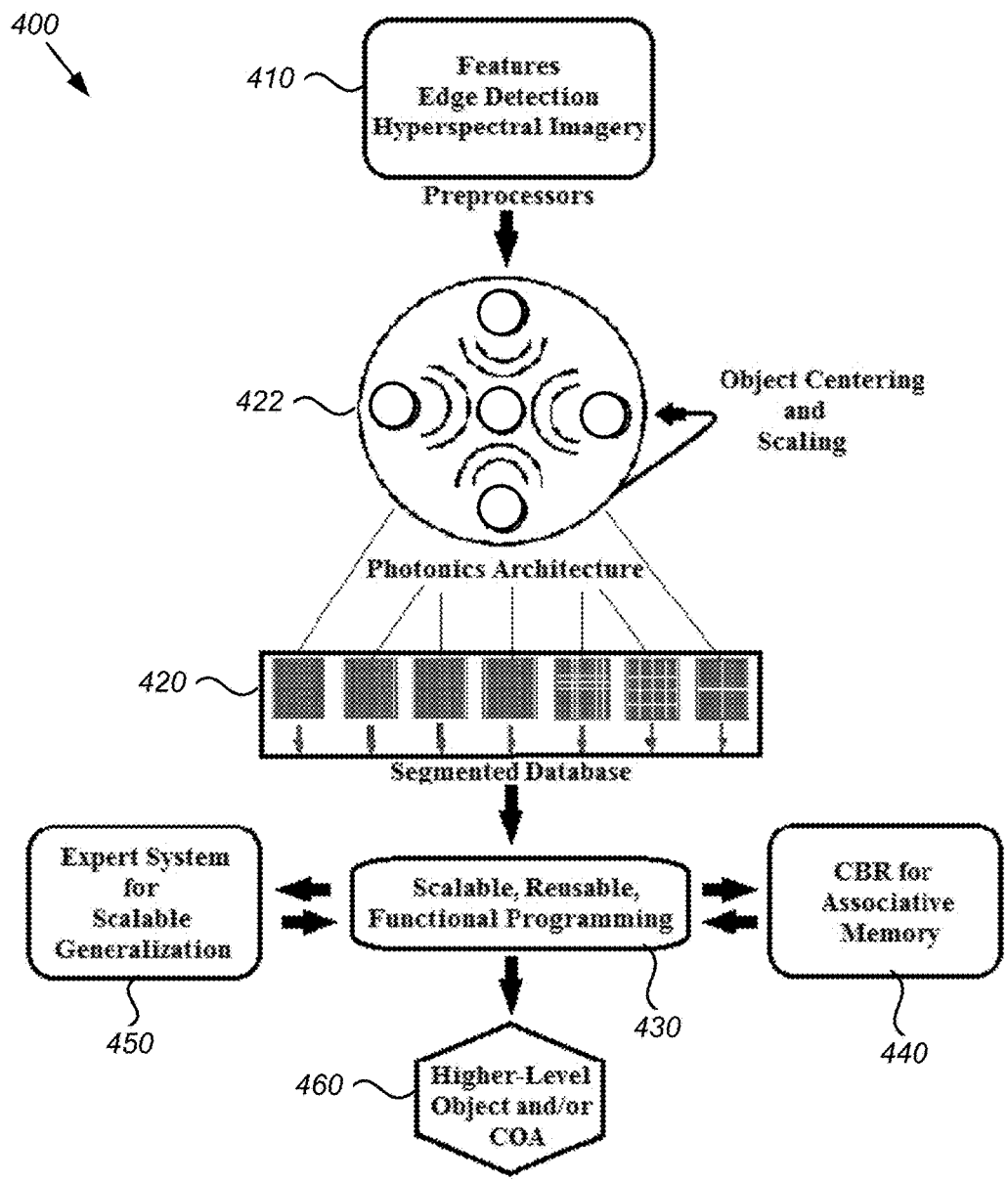
FIG. 4 shows a diagram illustrating an embodiment of a heterogeneous integrated photonic system in accordance with the disclosed embodiments.

FIG. 4 shows a diagram illustrating an embodiment of a heterogeneous integrated photonic system 400 in accordance with the disclosed embodiments. FIG. 4 shows the integration of the photonics processor with the database and knowledge base for semantic association and retrieval processing. System 400 includes a pre-processing system 410 that may be used for extraction of features, edge detection, or to process hyperspectral imagery. The output of system 410 is input into arrays of SLMs 420, which include SLMs 422. System 400 may further include a system 430 configured for scalable, reusable, functional programming, which can interact with a case-based reasoning system for associative memory 440 and an expert system for scalable generalization 450, to create an output 460 of higher-level object and/or course of action.

As an example, consider an image, which contains a ship and an axis flag. This ship may be at war with us—requiring a calculated response. Here, one subsystem recognizes a ship type, another recognizes a flag, and a third takes these outputs (among others—such as text defining if at war with the recognized nation) as inputs to map to a trained interpreted response (course of action). Feedback provides an opportunity for non-monotonic reasoning. Using hidden-layer neural nets, such feedback provides only another fundamental memory. However, since images (or equivalent) are composed of reusable components, such feedback provides combinations of what is known (e.g., an object moving against a background). The capabilities for object fusion and composition as well as the utilization of reusable subsystems and I/O constraints enables system responses in a way that would definitely not be tractable to achieve using hidden-layer neural networks. This opens the possibility for creative, interactive, and scalable systems of systems. This is also a driving force behind the search for scalable FM SLMs described above.

One embodiment of a method that may be used in accordance with the disclosed embodiments is discussed in the steps below:

1. Read in m mutually random I/O constraint pairs. These need not be optimally random; albeit, the more so, the less that need be read. They are used to train the system. Inputs comprise a square matrix of bits (x the number of filters used). Outputs comprise non-negative integer vectors (see FIG. 3).

2. Optionally, call a secondary system, such as a copy of this one, to center the image in the field of view. A digital and/or mechanical zoom may be included to properly size the image for a vision-processing system. This allows for the use of an order of magnitude smaller mesh sizes as is the case for the fovea. Similarly, digital signal filters (e.g., hi-pass, low-pass) may be used in non-visual domains.

3. The square mesh size will be fixed by the SLM hardware used (e.g., for a 256×256 mesh input). Here, the number of mutually random I/O constraint pairs need never exceed 256**2. Pragmatically, they can be far fewer (e.g., on the order of 256 or less). The block sizes are of rank 4, 16, 64, 256, 1,024, 4,096, and 16,384. Each block, at each rank, is sequentially processed by dedicated SLMs (see FIG. 3). The outputs of these photonic computations are ordered vectors of magnitude 16,384, 4,096, 1,024, 256, 64, 16, and 4, respectively. The range in intensity in each slices outputs is [0, 4], [0, 16], [0, 64], [0, 256], [0, 1,024], [0, 4,096], and [0, 16,384], respectively. Each output vector is optically summed to yield the next input vector in sequence. The cascading of slice outputs requires the summation of only four inputs per SLM. This minimizes the probability of error in numerical summation; albeit, not in intensity summation. Note that as the magnitude of the vectors is reduced, tiny parallel DSPs can be used to sum the final cascaded slices in lieu of FM SLMs without significant loss in speed.

4. Each supplied input matrix produces a set of output vectors. A database segmented by vector length is searched, in parallel, for an exact, then fuzzy match if the former is unsuccessful (see FIG. 4). The search proceeds from longest (most-specific) to shortest (most-general) output vectors, where the more-specific match is always favored. This search may be by way of a parallel matching algorithm, a bisection algorithm, or even linear search where the number of slices is less than about 8 (based on equating the logarithmic time for bisection with the linear midpoint). The single global error tolerance is initialized to zero, then one, and thereafter doubled/halved for a bisection search. The same percent error tolerance is maintained for each slice. Halving the block rank implies decreasing the capability of the SLM to differentiate intensities by a factor of four (and vice versa) for a constant numeric error. Blocks of least rank may thus allow zero error. Again, parallel DSPs can be used in lieu of FM SLMs, where appropriate. This search will converge on the minimal error tolerance for which a block slice of least rank (greatest vector output length) yields an associated output vector bearing a non-nil semantics, where it exists.

5. The match minimizing the 2-norm (i.e., a measure of the squared differential) is always selected. Otherwise, if the semantics produced by matching a slice against its database segment are non-deterministic, select one at random. If the produced semantics receives valid feedback, then nothing need be learned. (A move-to-the-head algorithm can be implemented in case tail deletion should be needed to garbage collect.) Otherwise, if there is no feedback because the vector is unknown within tolerance, the slice of greatest rank (least vector output length), whose associated output vector is unknown, or nil, is replaced by an association of the exact vector with the correct semantics. This result updates the segmented database. The rank of this slice may be no greater (i.e., the vector output length may be no less) than that for the slice producing an erroneous result. If the erroneous result was produced by an exact match of the vector, then that vector in the same slice has its associated semantics replaced if and only if there is no slice of immediately lesser rank. Otherwise, that slice acquires the new vector and its associated semantics. However, if the vector was an exact match, then only its associated semantics will be updated, if in error, or non-deterministically acquired if not in error. These updates occur in the segmented database.
6. The vectors (along with their linked semantics) are maintained in the segmented database in lexicographic order. They are searched using a bisection algorithm for both retrieval and insertion. A bisection search involving error tolerances includes a linear search between the found lower and upper bisection boundaries.
7. A slice may be defined for multiple views (e.g., the three primary colors, or RGB filters). Such slices define concatenated vectors implying a single semantics. Acoustic, radar, and other signatures are processed similarly. Indeed, mutually random sensory modalities may be so fused for an extensible capability for stereo and/or hyperspectral imagery.
8. I/O training sets, as well as subsystems, may be indexed in a library, retrieved and reused. This process provides an economy of scale—in design as well as in the time required for training a neural system.
9. A conventional expert system can process the produced symbolic vectors at the backend to further generalize their capabilities for recognition (see FIG. 4). Similarly, a case-based system can provide an associative memory for partially known vectors. Both knowledge-based systems can accept, as input, the recognition of multiple objects and produce, as output, a higher-level object and/or a COA. Similarly, edge detection algorithms can be used to preprocess the input vectors to yield sets of features for improved performance. Again, multiple sensory modalities can be fused for hyperspectral imagery (or equivalent).
10. Feedback enables non-monotonic reasoning. This can provide for tractable object fusion and composition for creative and scalable systems of systems.

Figure 5:
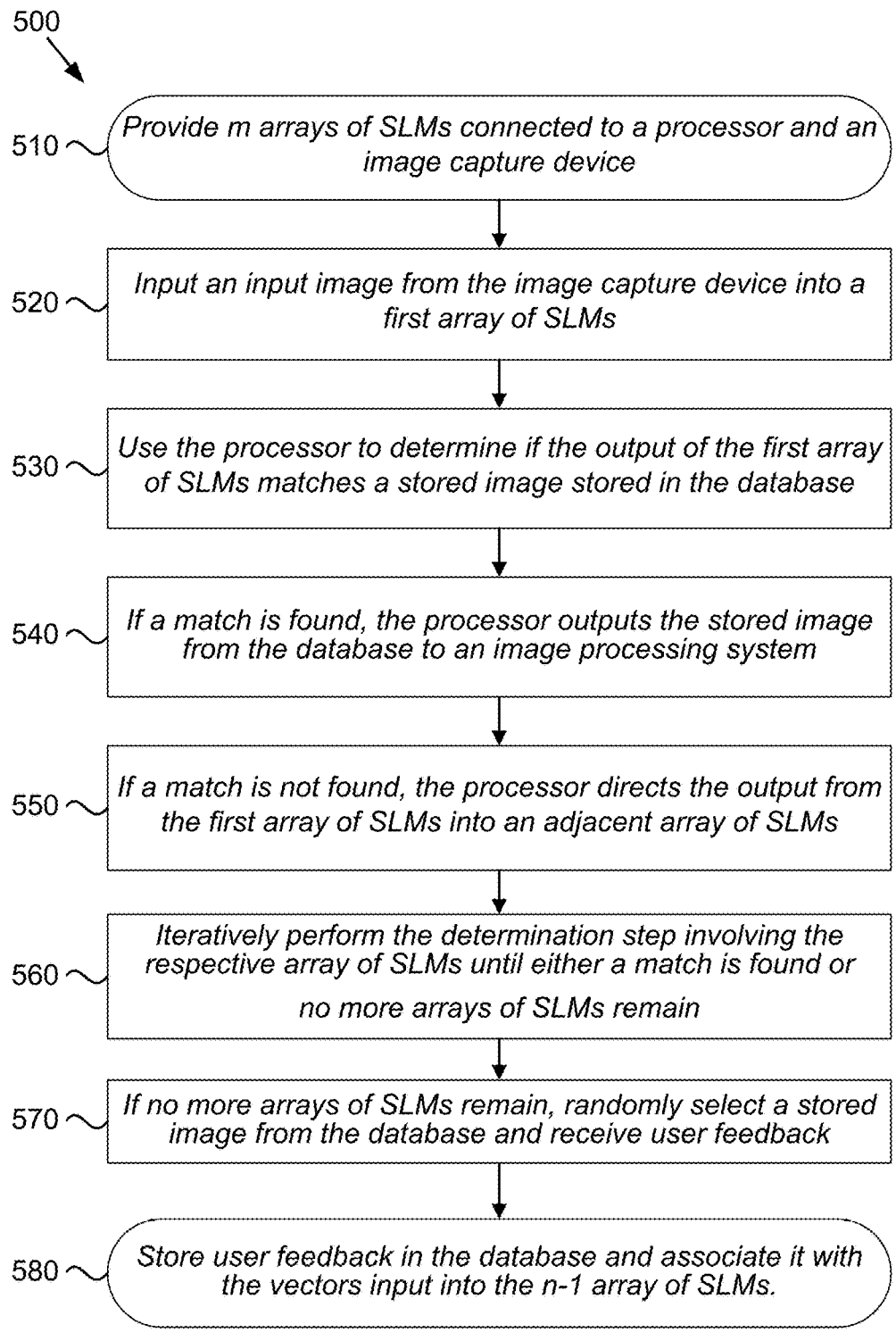
FIG. 5 shows a flowchart of an embodiment of a method in accordance with the disclosed embodiments.

FIG. 5 shows flowchart of an embodiment of a method 500 in accordance with the disclosed embodiments. Some or all of the steps of method 500 may be performed by a system such as system 100 shown in FIG. 1. Further, while FIG. 5 shows one embodiment of method 500 including steps 510-580, other embodiments of method 500 may contain fewer steps or more steps. Further, while in some embodiments the steps of method 500 may be performed as shown in FIG. 5, in other embodiments the steps may be performed in a different order, or certain steps may occur simultaneously with one or more other steps.

Method 500 may begin at step 510, which involves providing n arrays of m spatial light modulators (SLMs) 120 connected to both a processor 130 and an image capture device 110. The processor 130 is connected to a database 140. The arrays of SLMs 120 are cascaded and have sequentially decreasing block ranks (see FIG. 3). In some embodiments, the database is segmented by vector length.

Step 520 involves inputting an input image 111 from the image capture device 110 into a first array of SLMs 122 of the arrays of SLMs 120, where the input image 111 is represented by a matrix of bits. In some embodiments, method 500 further includes, prior to step 520, pre-processing the input image using one or more of a feature detection algorithm, an edge detection algorithm, and an algorithm for processing hyperspectral imagery.

Step 530 involves determining, using the processor 130, if the output of the first array of SLMs 122 matches a stored image stored within the database 140. The output of the first array of SLMs 123 is represented by a set of non-negative integer vectors created by the first array of SLMs 122 by optically summing the matrix of bits using SLMs within the first array of SLMs 122. A match is found by comparing the length of individual integer vectors within the set of non-negative integer vectors with vectors of stored images stored within the database 140.

In some embodiments, step 530 involves a search for a match with the vectors of stored images stored in the database by proceeding with the longest and most specific output vectors of the set of non-negative integer vectors created by the first array of SLMs to the shortest and most general output vectors of the set of non-negative integer vectors created by the first array of SLMs. In such embodiments, if more than one matches of output vectors of the set of non-negative integer vectors are made with the vectors of stored images stored in the database, the processor selects the match involving the longest and most specific output vectors of the set of non-negative integer vectors. As an example, the search for a match with the vectors of stored images stored in the database is performed by one of a parallel matching algorithm, a bisection algorithm, and a linear search.

In some embodiments, prior to step 540, the processor receives user feedback on the matched stored image. If the user feedback on the matched stored image indicates an error, then the processor replaces the semantics associated with the vectors of the matched stored image with semantics associated with the user feedback. In some embodiments, prior to step 540, the processor receives input from a case-based reasoning system for associative memory. In some embodiments, prior to step 540, the processor receives input from a case-based reasoning system for scalable generalization.

If a match is found at step 530, step 540 involves the processor 130 outputting a stored image 137 associated with the respective matching vectors of the stored image in the database 140 to an image processing system 160. If a match is not found at step 530, step 550 involves the processor 130 directing the set of non-negative integer vectors 131 output from the first array of SLMs 122 into an input of an array of SLMs adjacent to the first array of SLMs, namely second array 124.

Step 560 involves iteratively performing the determining step for the remaining arrays of SLMs 120, particularly array n 126, until either a match is found or no further arrays of SLMs remain. If no further arrays of SLMs remain, step 570 involves the processor 130 randomly selecting a stored image from the database 140 and the processor 130 obtains user feedback on the randomly-selected stored image from a user input system 150 connected to the processor 130. The user feedback correctly identifies the recognition of the input image compared to the randomly-selected stored image. Step 580 involves the user feedback being stored by the processor 130 in the database 140 as being associated with the set of non-negative integer vectors input into the n−1 array of SLMs 120.

Some or all of the steps of method 500 may be stored on a non-transitory computer readable storage medium, wherein the steps are represented by computer readable programming code. The steps of method 500 may also be computer-implemented using a programmable device, such as a computer-based system. Method 500 may comprise instructions that, when loaded into a computer-based system, cause the system to execute the steps of method 500. Method 500 may be implemented using various programming languages, such as "Java", "C", or "C++".

Various storage media, such as magnetic computer disks, optical disks, and electronic memories, as well as computer readable media and computer program products, can be prepared that can contain information that can direct a device, such as a micro-controller, to implement the above-described systems and/or methods. Once an appropriate device has access to the information and programs contained on the storage media, the storage media can provide the information and programs to the device, enabling the device to perform the above-described systems and/or methods.

For example, if a computer disk containing appropriate materials, such as a source file, an object file, or an executable file, were provided to a computer, the computer could receive the information, appropriately configure itself, and perform the functions of the various systems and methods outlined in the diagrams and flowcharts above to implement the various functions. That is, the computer could receive various portions of information from the disk relating to different elements of the above-described systems and/or methods, implement the individual systems and/or methods, and coordinate the functions of the individual systems and/or methods.

The above-described system and methods have many advantages. First, training, unlike that for all other neural networks having at least one hidden layer, is polynomial time (i.e., fast). As a consequence, subsystems are reusable with minor additional training. The system is also tolerant of small errors—allowing for the use of photonic hardware (SLMs). These are far faster as well as conservative of space and power. Relatively few parallel DSP chips can substitute in the final cascaded photonic "slices" for an immediately implementable design. Stereo and/or hyperspectral imagery can be realized through the use of concatenated vectors (e.g., RGB vectors for color). Edge detection algorithms can be used to remove background clutter from features for improved performance.

Another advantage is that an expert system at the backend can generalize recognized symbols for more knowledgeable recognition than is possible in a hidden-layer neural network. Further, a case-based system, at the backend (as shown in FIG. 4), enables the associative recall of complex objects from a partial (i.e., obscured) input pattern. This forms the basis for symbolic analogy—something, which conventional hidden-layer neural networks cannot do. Such a system can find for analogy between a major and a minor diagonal in Tic-Tac-Toe, which is something that a hidden-layer neural net would need to be explicitly trained on. Similarly, knowledge-based analogies (e.g., where and when one may substitute one fuel type for another) become practical—again, unlike the case for hidden-layer neural networks.

An additional advantage is that, unlike hidden-layer neural nets, the photonic net based system described above is capable of modus ponens (i.e., symbolic reasoning). A programmable backend allows for the production of metaphorical explanations. I/O constraint sets, used for training, as well as previously developed subsystems, can be stored and indexed in and retrieved from a library.

The above-described methodology benefits from an FM SLM for more accurate optical summation (i.e., a distinct patent). Tiny parallel DSPs can be used to sum the final cascaded slices in lieu of FM SLMs without significant loss in speed. Further, I/O constraint sets can be hill-climbed. This means that not all constraints need be satisfied for learning to occur. Training is almost as fast as recognition and amenable to parallel processing; whereas, hidden-layer neural nets require exponentially more time for training. Learning occurs in the vector of least magnitude, which is free of contradiction so as to be as general (and thus reusable) as possible. The weight sets found in conventional hidden-layer neural nets are too context-sensitive to allow for efficient reuse.

Incorrect maps (corrective learning) require that a vector of slightly greater magnitude, where available, be created. Such a vector corresponds to more-specific learning, which preempts the error from recurring. Centering an image (focus of attention) can be accomplished using a second system, which is trained to center an arbitrary image on the input matrix using two degrees of freedom for motion. A third degree would be to control the digital and/or mechanical zoom of the lens as well—for a most information-bearing image. This is especially useful for image recognition by composition. A 256×256 input mesh can be recognized using seven cascaded photonic layers, where each SLM sums only four inputs; albeit, of increasingly similar intensities, which need to be discriminated among. A database segmented by vector length is searched, in parallel, for an exact, then fuzzy match if the former is unsuccessful.

A fuzzy error metric is dynamically adjusted to propagate among slices. The first match having minimal error in the most-specific slice is sought. Non-determinism is permitted and resolved at chance. A bisection search involving error tolerances includes a linear search between the found lower and upper bisection boundaries. This finds (or returns with failure) the best match in O (log n) time (the linear portion is represented by a constant, since it is of fixed size). Given the use of an allowed error tolerance on top of a lexicographic ordering, this is the best that can be done.

Not only is the above-described photonic net based system very fast, but it scales far better than do hidden-layer neural nets, which lose a fundamental memory for every new training beyond a certain point. Photonic brains allow decision making to occur at roughly one billion times the speed of the human brain based on the ratio of photonic to neuronal transmission and summation speeds. Feedback provides an opportunity for non-monotonic reasoning. Using hidden-layer neural nets, such feedback only provides the opportunity to retrieve another fundamental memory. However, since images (or equivalent) are composed of reusable components, such feedback can provide a photonic net with combinations of what is known (e.g., an object moving against a background). It can do this with decreasing memory requirements (as a consequence of randomization).

The language used in the specification has been principally selected for readability and instructional purposes, and may not have been selected to delineate or circumscribe the inventive subject matter. Accordingly, the disclosure of the inventive subject matter is intended to be illustrative, but not limiting, of the scope of the invention, which is set forth in the following claims.

Further, many modifications and variations of the embodiments disclosed herein are possible in light of the above description. Within the scope of the appended claims, the disclosed embodiments may be practiced otherwise than as specifically described. Further, the scope of the claims is not limited to the implementations and embodiments disclosed herein, but extends to other implementations and embodiments as may be contemplated by those having ordinary skill in the art.

I claim:

1. A method comprising:

providing n arrays of m spatial light modulators (SLMs) connected to both a processor and an image capture device, wherein the processor is connected to a database, wherein the arrays of SLMs are cascaded and have sequentially decreasing block ranks;

inputting an input image from the image capture device into a first array of SLMs of the arrays of SLMs, wherein the input image is represented by a matrix of bits;

determining, using the processor, if the output of the first array of SLMs matches a stored image stored within the database, wherein the output of the first array of SLMs is represented by a set of non-negative integer vectors created by the first array of SLMs by optically summing the matrix of bits using SLMs within the first array of SLMs, wherein a match is found by comparing the length of individual integer vectors within the set of non-negative integer vectors with vectors of stored images stored within the database, wherein if a match is found the processor outputs a stored image associated with the respective matching vectors of the stored image in the database to an image processing system, wherein if a match is not found the processor directs the set of non-negative integer vectors output from the first array of SLMs into an input of an array of SLMs adjacent to the first array of SLMs; and iteratively performing the determining step for the remaining arrays of SLMs until either a match is found or no further arrays of SLMs remain, wherein if no further arrays of SLMs remain the processor randomly selects a stored image from the database and the processor obtains user feedback on the randomly-selected stored image from a user system connected to the processor, wherein the user feedback correctly identifies the recognition of the input image compared to the randomly-selected stored image, wherein the user feedback is stored by the processor in the database as being associated with the set of non-negative integer vectors input into the n−1 array of SLMs.

2. The method of claim 1 further comprising, prior to the step of inputting an input image from an image capture device connected to the array of SLMs into a first array of SLMs of the array of SLMs, pre-processing the input image using one or more of a feature detection algorithm, an edge detection algorithm, and an algorithm for processing hyperspectral imagery.

3. The method of claim 1, wherein the database is segmented by vector length.

4. The method of claim 3, wherein the step of determining, using the processor, if the output of the first array of SLMs matches a stored image stored within the database involves a search for a match with the vectors of stored images stored in the database by proceeding with the longest and most specific output vectors of the set of non-negative integer vectors created by the first array of SLMs to the shortest and most general output vectors of the set of non-negative integer vectors created by the first array of SLMs.

5. The method of claim 4, wherein if more than one matches of output vectors of the set of non-negative integer vectors are made with the vectors of stored images stored in the database, the processor selects the match involving the longest and most specific output vectors of the set of non-negative integer vectors.

6. The method of claim 4, wherein the search for a match with the vectors of stored images stored in the database is performed by one of a parallel matching algorithm, a bisection algorithm, and a linear search.

7. The method of claim 1 further comprising the step of, prior to the processor outputting a stored image associated with the respective matching vectors of the stored image in the database to an image processing system if a match is found, the processor receives user feedback on the matched stored image, wherein if the user feedback on the matched stored image indicates an error, then the processor replaces the semantics associated with the vectors of the matched stored image with semantics associated with the user feedback.

8. The method of claim 1 further comprising the step of, prior to the processor outputting a stored image associated with the respective matching vectors of the stored image in the database to an image processing system if a match is found, the processor receives input from a case-based reasoning system for associative memory.

9. The method of claim 1 further comprising the step of, prior to the processor outputting a stored image associated with the respective matching vectors of the stored image in the database to an image processing system if a match is found, the processor receives input from a case-based reasoning system for scalable generalization.

10. A system comprising:

an image capture device;

a plurality of n arrays of m spatial light modulators (SLMs) connected to the image capture device, wherein the arrays of SLMs are cascaded and have sequentially decreasing block ranks;

a processor connected to the arrays of SLMs;

a database connected to the processor, the database having a plurality of stored images stored therein;

an image processing device connected to the processor; and a user system connected to the processor, wherein the image capture device is configured to input an input image into a first array of SLMs of the arrays of SLMs, wherein the input image is represented by a matrix of bits, wherein the processor is configured, via a set of implementable instructions stored therein, to determine if the output of the first array of SLMs matches a stored image stored within the database, wherein the output of the first array of SLMs is represented by a set of non-negative integer vectors created by the first array of SLMs by optically summing the matrix of bits using SLMs within the first array of SLMs, wherein the processor is configured to determine a match by comparing the length of individual integer vectors within the set of non-negative integer vectors with vectors of stored images stored within the database, wherein if a match is found the processor is configured to output a stored image associated with the respective matching vectors of the stored image in the database to the image processing device.

11. The system of claim 10, wherein if a match is not found, the processor is further configured to direct the set of non-negative integer vectors output from the first array of SLMs into an input of an array of SLMs adjacent to the first array of SLMs.

12. The system of claim 11, wherein the processor is further configured to iteratively perform the determining step for the remaining arrays of SLMs until either a match is found or no further arrays of SLMs remain, wherein if no further arrays of SLMs remain the processor is configured to randomly select a stored image from the database and the processor is configured to obtain user feedback on the randomly-selected stored image from the user system, wherein the user feedback correctly identifies the recognition of the input image compared to the randomly-selected stored image.

13. The system of claim 12, wherein the processor is further configured to store the user feedback in the database as being associated with the set of non-negative integer vectors input into the n–1 array of SLMs.

14. The system of claim 10, wherein each SLM contained within the arrays of SLMs comprise frequency modulated SLMs.

15. The system of claim 10, wherein each SLM contained within the arrays of SLMs comprise amplitude modulated SLMs.

16. The system of claim 10, wherein each SLM contained within the arrays of SLMs comprise SLMs with four input ports and one output port.

17. The system of claim 10, wherein the database is segmented by vector length.

18. The system of claim 17, wherein the processor is configured to search for a match with the vectors of stored images stored in the database by proceeding with the longest and most specific output vectors of the set of non-negative integer vectors created by the first array of SLMs to the shortest and most general output vectors of the set of non-negative integer vectors created by the first array of SLMs.

19. The system of claim 18, wherein if more than one matches of output vectors of the set of non-negative integer vectors are made with the vectors of stored images stored in the database, the processor is configured to select the match involving the longest and most specific output vectors of the set of non-negative integer vectors.

20. A system comprising:
an image capture device;
a plurality of n arrays of m spatial light modulators (SLMs) connected to the image capture device, wherein the arrays of SLMs are cascaded and have sequentially decreasing block ranks;
a processor connected to the arrays of SLMs;
a database connected to the processor, the database having a plurality of stored images stored therein, wherein the database is segmented by vector length;
an image processing device connected to the processor; and
a user system connected to the processor,
wherein the image capture device is configured to input an input image into a first array of SLMs of the arrays of SLMs, wherein the input image is represented by a matrix of bits, wherein the processor is configured, via a set of implementable instructions stored therein, to determine if the output of the first array of SLMs matches a stored image stored within the database, wherein the output of the first array of SLMs is represented by a set of non-negative integer vectors created by the first array of SLMs by optically summing the matrix of bits using SLMs within the first array of SLMs, wherein the processor is configured to determine a match by comparing the length of individual integer vectors within the set of non-negative integer vectors with vectors of stored images stored within the database, wherein if a match is found the processor is configured to output a stored image associated with the respective matching vectors of the stored image in the database to the image processing device, wherein if a match is not found, the processor is further configured to direct the set of non-negative integer vectors output from the first array of SLMs into an input of an array of SLMs adjacent to the first array of SLMs, wherein the processor is further configured to iteratively perform the determining step for the remaining arrays of SLMs until either a match is found or no further arrays of SLMs remain, wherein if no further arrays of SLMs remain the processor is configured to randomly select a stored image from the database and the processor is configured to obtain user feedback on the randomly-selected stored image from the user system, wherein the user feedback correctly identifies the recognition of the input image compared to the randomly-selected stored image, wherein the processor is further configured to store the user feedback in the database as being associated with the set of non-negative integer vectors input into the n–1 array of SLMs, wherein the processor is configured to search for a match with the vectors of stored images stored in the database by proceeding with the longest and most specific output vectors of the set of non-negative integer vectors created by the first array of SLMs to the shortest and most general output vectors of the set of non-negative integer vectors created by the first array of SLMs, wherein if more than one matches of output vectors of the set of non-negative integer vectors are made with the vectors of stored images stored in the database, the processor is configured to select the match involving the longest and most specific output vectors of the set of non-negative integer vectors.

* * * * *